April 18, 1961 V. SACCO 2,980,295

LIQUID-PUMPING APPARATUS AND METHOD

Filed Aug. 13, 1958 8 Sheets-Sheet 1

Inventor
Victor Sacco
by Rines and Rines
Attorneys

Inventor
Victor Sacco
by [signature]
Attorneys

LIQUID-PUMPING APPARATUS AND METHOD

Filed Aug. 13, 1958

8 Sheets-Sheet 3

Inventor
Victor Sacco
by [signature]
Attorneys

April 18, 1961 V. SACCO 2,980,295

LIQUID-PUMPING APPARATUS AND METHOD

Filed Aug. 13, 1958 8 Sheets-Sheet 4

Inventor
Victor Sacco
by
Attorneys

Inventor
Victor Sacco
by
Attorneys

April 18, 1961 V. SACCO 2,980,295

LIQUID-PUMPING APPARATUS AND METHOD

Filed Aug. 13, 1958 8 Sheets-Sheet 6

Inventor
Victor Sacco
by [signature]
Attorneys

April 18, 1961 V. SACCO 2,980,295

LIQUID-PUMPING APPARATUS AND METHOD

Filed Aug. 13, 1958 8 Sheets-Sheet 7

Inventor
Victor Sacco
by Rines and Rines
Attorneys

Inventor
Victor Sacco
by
Attorneys

United States Patent Office 2,980,295

Patented Apr. 18, 1961

2,980,295

LIQUID-PUMPING APPARATUS AND METHOD

Victor Sacco, 265 Park Ave., Revere, Mass., assignor of one-half to James Sacco, Saugus, Mass.

Filed Aug. 13, 1958, Ser. No. 754,846

15 Claims. (Cl. 222—66)

The present invention relates to apparatus including pumps for pumping liquid, such as oil, gasoline, and the like, out of a tank, and to methods of operating the same. The invention is more particularly related to apparatus of this character in which it is desired to stop the operation of the pump when the tank becomes empty, or when the oil, gasoline or other liquid therein sinks to a predetermined level, even though the tank is not quite empty.

In a copending application, entitled, "Liquid-Delivering-and-Metering Apparatus and Method," Serial No. 754,845, filed of even date herewith, there is disclosed a delivery truck upon which is mounted a tank from which oil, for example, is delivered, through a hose, into the storage tanks of householders and others, for use as fuel. The invention of the said application is concerned more particularly with preventing false recordings of the meter that meters the delivered oil. According to one form of the invention disclosed in the said copending application, this result is attained by stopping the operation of the oil-delivery pump as soon as the tank becomes empty, or sinks to a predetermined level. The present invention, however, has wider application, and is not restricted to apparatus including meters.

An object of the present invention, therefore, is to provide a new and improved apparatus for and method of terminating the operation of the pump; either when the tank becomes empty, or when the level of the oil in the tank falls to a predetermined level.

Other and further objects will be explained more fully hereinafter, and will be more particularly pointed out in the appended claims.

With the above objects in view, a feature of the invention resides in a novel method of and apparatus for disconnecting the pump from its driving mechanism as soon as the tank becomes empty, or when the liquid in the tank falls to a predetermined level.

According to the specific embodiment of the invention that is herein illustrated and described, a valve is caused to close the outlet of the tank as soon as it becomes empty, or as soon as the oil sinks to the predetermined level in the tank. Provision is made for thereupon automatically terminating the operation of the pump. This may be effected in any of a number of different ways. The preferred apparatus may comprise a bypass chamber that is connected between the outlet of the tank and the pump. As soon as the oil becomes fully pumped out of the tank, or falls to the predetermined level, the valve closes the outlet, whereupon continued operation of the pump results in creating suction or a vacuum in the by-pass chamber. This suction is sufficient to actuate a switch, for example, or a piston in a cylinder, or other suitable mechanism. The switch, piston or other mechanism may be connected to gearing for disconnecting the pump from its source of power. The invention, however, may be practiced otherwise than with the aid of gearing.

The invention will now be more fully explained in connection with the accompanying drawings, in which Fig. 1 is a side elevation, with parts broken away, for clearness, of a truck on which is mounted an oil tank provided with one embodiment of the present invention;

Referring first to Figs. 1 to 7, inclusive, there is illustrated therein a truck 2, upon which is mounted a tank comprising two compartments 4 and 6 for containing the liquid, assumed here, for definiteness, to be oil. The invention is equally applicable for use with only a single tank compartment 4, or with more than two tank compartments 4 and 6, but the two tank compartments 4 and 6 are illustrated herein for purposes of explanation of the invention. Each tank compartment may be provided with a vent, which may, for example, be positioned at its dome cover, not shown, for the entry of air thereinto during the delivery therefrom of the oil contained therein.

Figure 1:
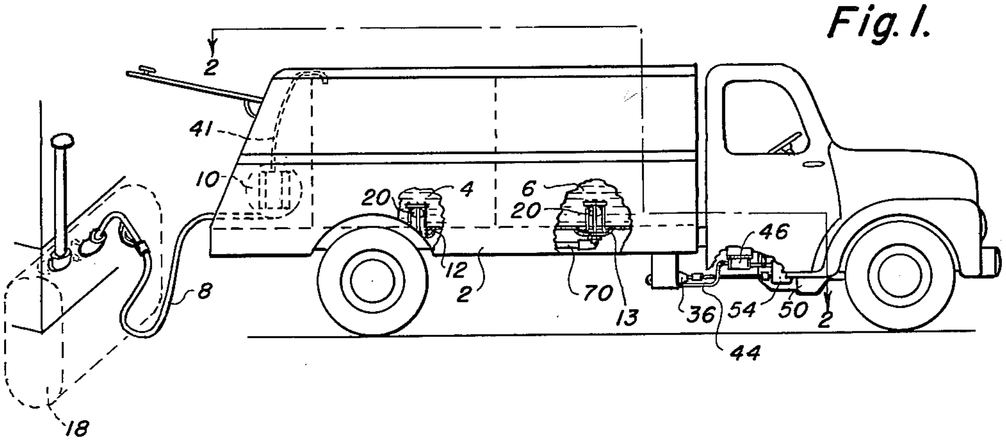
Figures 2, 3:
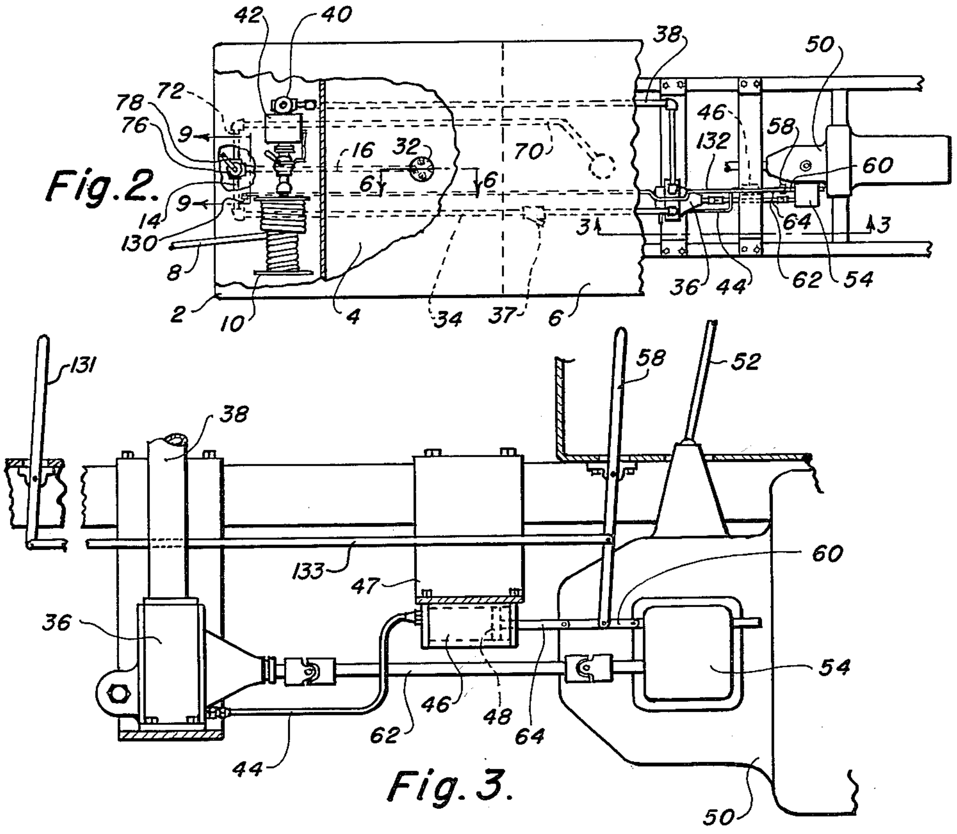
Fig. 2 is a horizontal section, taken upon the line 2—2 of Fig. 1, looking downward, in the direction of the arrows.
Fig. 3 is a fragmentary vertical longitudinal section, upon a larger scale, taken upon the line 3—3 of Fig. 2, looking in the direction of the arrows.

One end of a delivery hose 8, rolled upon a reel 10, may be connected, by mechanism more fully described hereinafter, to either the circular outlet 12, at the bottom of the tank compartment 4, or to a similar circular outlet 13, at the bottom of the tank compartment 6. For the present, it will suffice to say that the outlet 12, at the bottom of the compartment 4, is connected to a pipe 16, which constitutes a connection to the tank compartment 4, through which to deliver the oil therefrom. The connection pipe 16, in turn, is connected to a pipe 14. In several of the views, only a single pipe line 14 is shown, for diagrammatic purposes. The nozzle at the other end of the hose 8 is shown in Fig. 1 emptying into a storage tank 18, for an oil burner, at the home of a householder.

The outlet 12, at the bottom of the compartment 4, may be closed by an air-tight float-valve 20. The most efficient type of float-valve 20 has been found, in practice, to be constituted of a floatable ball, not of metal but a suitable plastic, of proper diameter. Polyvinyl chloride has been found to be admirably adapted for the purpose. The polyvinyl chloride, originally combined with plasticizers, fillers and the like so as to render it relatively soft, soon hardens in the oil of the tank, and shrinks, about a quarter inch, to a diameter that, though larger than the diameter of the circular outlet, and large enough to prevent the ball from binding against the circular wall of the outlet, so as to render it readily releasable, is nevertheless small enough to provide a very efficient seal against the circular wall of the outlet. It has been found that a ball float-valve of unsuitable material or diameter binds so firmly against the circular wall of the outlet 12 or 13 that it will not automatically become dislodged from its outlet seat when the tank compartment is refilled, and it becomes necessary for someone to enter the tank, by way of its dome cover, in order manually to lift the ball from its seat. Air-tight empty balls of polyvinyl chloride, of the proper diameter, as above described, have eliminated, in practice, all difficulties of this nature.

Figure 4:
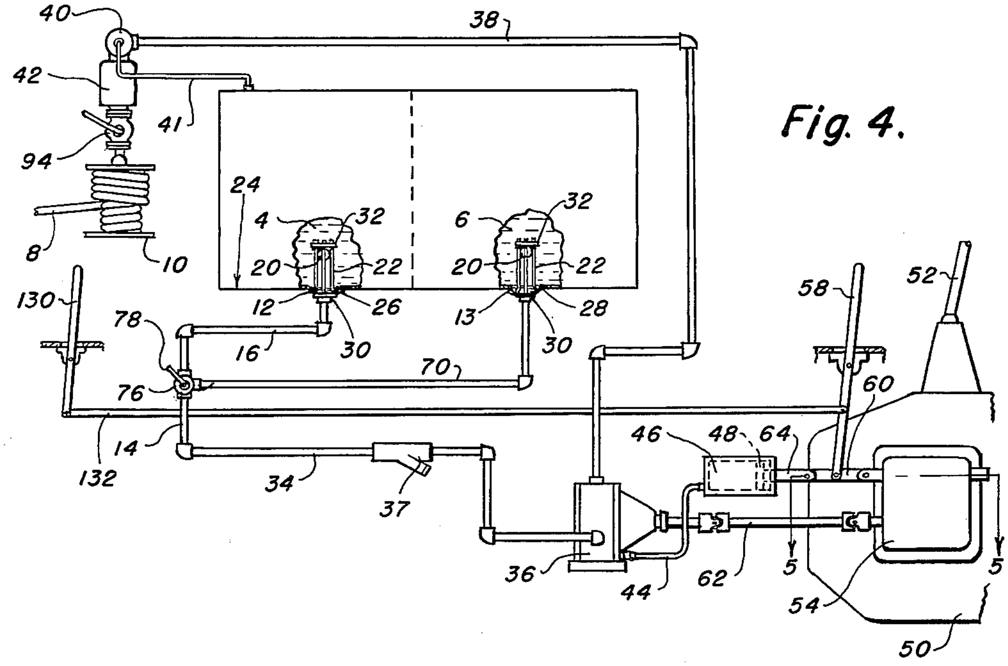
Fig. 4 is a schematic view, the better to illustrate the invention diagrammatically.
Figure 5:
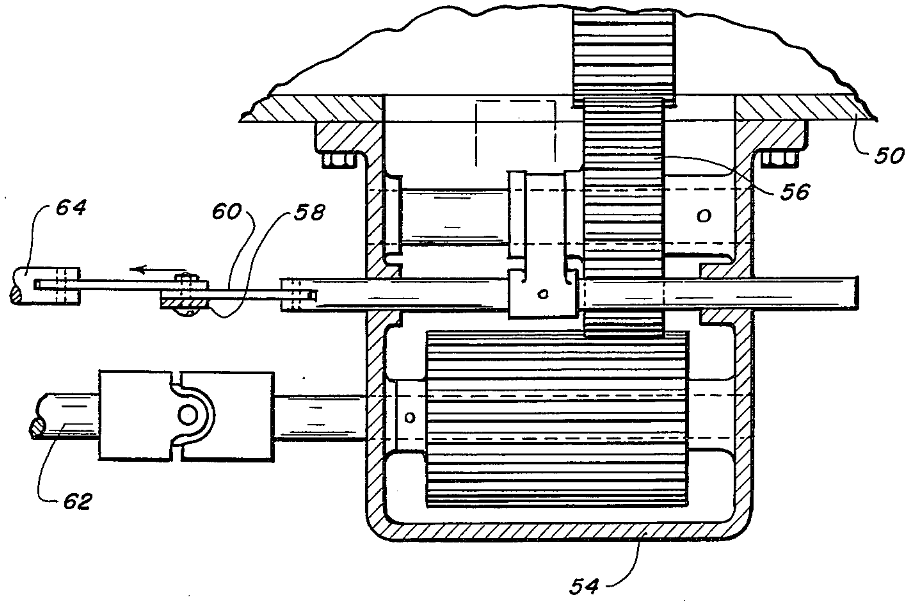
Fig. 5 is a horizontal section, upon a larger scale, taken upon the line 5—5 of Fig. 4, looking downward, in the direction of the arrows, through the power take-off unit.
Figures 6, 7:
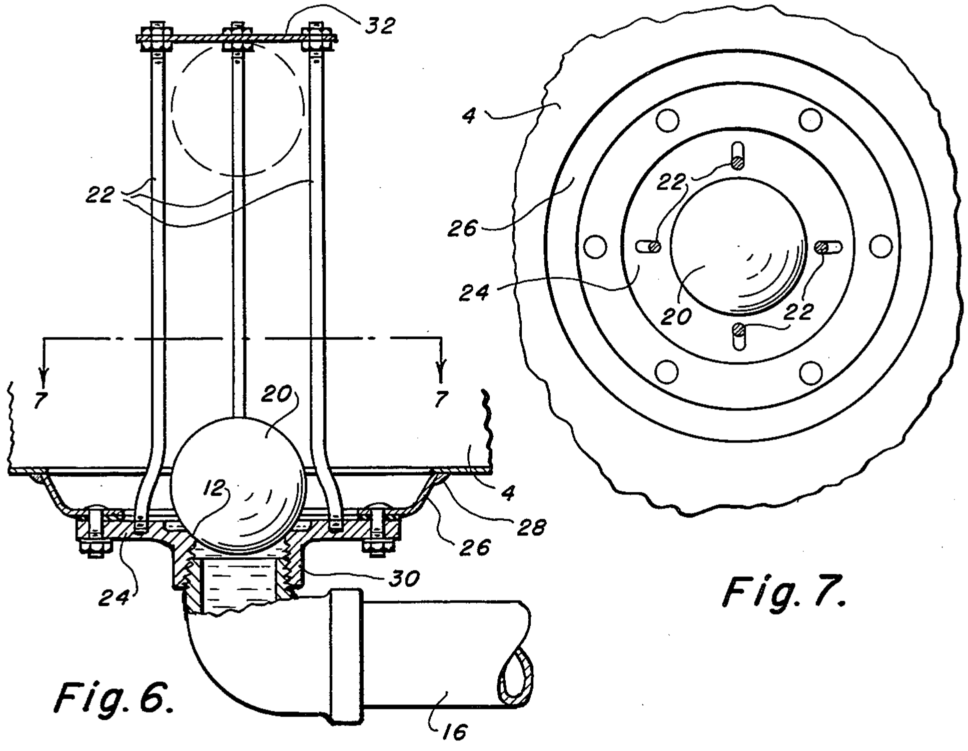
Fig. 6 is a vertical section, upon a still larger scale, taken upon the line 6—6 of Fig. 2, looking in the direction of the arrows, showing a ball float-valve in its cage, with adjacently disposed parts.
Fig. 7 is a plan section of the parts shown in Fig. 6, taken upon the line 7—7 of Fig. 6, looking downward, in the direction of the arrows.

The float-valve 20, of course, will tend to rise to the level of the oil contained in the compartment 4. In Figs. 1, 4 and 7, it is shown guided in its rising and falling floating movements, with the oil contained in the compartment 4, within a cage, shown constituted of four equally spaced vertically disposed guiding rods 22. At their lower ends, the guiding rods 22 are shown secured to the floor 24 of a substantially cup-shaped sump 26, the free upper edge or edges of which are welded, as shown at 28, to the bottom of the compartment 4 just below an opening 23 at the bottom of the tank compartment 4. Other kinds of sumps and cages, as will hereinafter appear, may also be employed. According to the embodiment of the invention illustrated by Figs. 1 to 7, inclusive, however, the outlet 12 is centrally disposed on the floor 24, and the pipe 16 is shown screwed into a threaded sleeve 30 depending from this floor 24, just below the outlet 12. The oil is delivered from the tank, by way of the sump 26, to the pipe 16.

At their upper ends, the guiding rods 22 are shown connected by a spider 32, for confining the float-valve 20 within the cage. Similar mechanism is provided adjacent to the outlet in the bottom of the compartment 6.

The pipe 14 is shown connected, by a pipe 34, to a pump 36. The pump 36 is illustrated as of the rotary type. As is well-known, it is desirable to keep air out of this type of pump, and to have it operate on liquids only. The volume of the pipe 34, which is shown diagrammatically, may be larger than is provided by a pipe. For definiteness, it may be referred to as a pump-connection chamber. A strainer, shown diagrammatically at 37, may be interposed between the pipe 14 and the pump 36, for filtering out grit and other impurities from the oil.

The pump 36 becomes thus connected to the outlet 12 by way of the connection pipes 34, 14 and 16. When the float-valve 20 is raised, and the outlet 12, therefore, is open, the pump 36 will deliver oil from the tank compartment 4, through the outlet 12 and by way of the connections pipes 16, 14 and 34, into a pipe 38. The pipe 38 is shown connected to a conventional air release, air separator or air eliminator 40 that is connected to a meter 42. A suitable meter, for example, is illustrated and described in Letter Patent 2,286,411, issued June 16, 1942, to Neptune Meter Company, as assignee of Charles S. Hazard. These meters are sold, on the market, with the air release, air separator, or air eliminator 40 annexed thereto, and also with a mechanism for stopping the operation of the meter at a predetermined setting of the meter.

Figure 12:
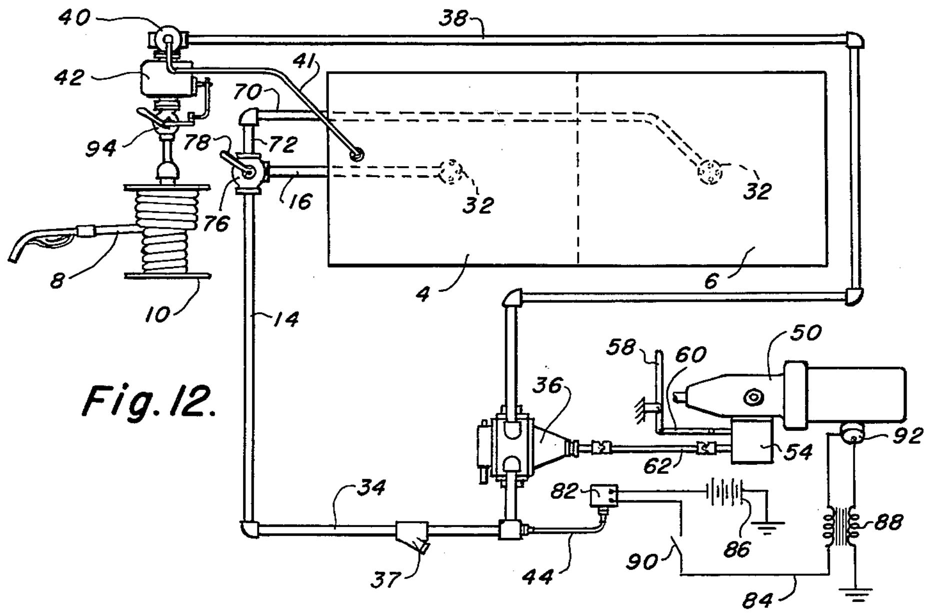
Fig. 12 is a view somewhat similar to Fig. 2, but upon a larger scale, illustrating a modified apparatus for terminating the operation of the pump.

As illustrated in Figs. 1, 4 and 12, the air release or air separator or air eliminator 40 may be connected to the air in the upper part of the compartment 4 by a pipe 41. The air release may be provided with a float-valve, not shown, that drops when sufficient air accumulates, thus opening the valve, to allow the accumulated air to vent back into the compartment 4. The meter 42 is connected to the first-named end of the hose 8.

It is in this manner that the oil may be delivered from the tank compartment 4, through the outlet 12 and by way of the connection pipes 34, 14, 16 and 38, and through the air release 40 and the meter 42, by way of these connections, into the householder's storage tank 18. By reason of this travel of the oil through the meter 42, during its delivery from the tank 4, the meter 42 becomes enabled to meter the oil delivered from the tank 4.

The function of the air release 40 is theoretically to keep air out of the meter 42, thereby to prevent a false meter reading. The air release 40 does not, however, operate efficiently, particularly when large quantities of air are delivered by the pump 36 from the tank compartment 4. After the compartment 4 empties, therefore, false readings are obtained in the meter 42, caused by the air that the pump 36 continues to pump out of the emtpy tank compartment 4 and through the meter 42. This difficulty is entirely overcome by the invention of the before-mentioned copending application, as will appear from the following.

In due time, the oil will become substantially all pumped out from the compartment 4. The float-valve 20 will thereupon become seated, to close the outlet 12. It will then become impossible for the pump 36 to pump any further fluid, whether oil or air, out of the compartment 4. It will be impossible to pump out of the compartment 4 even any such slight amount of oil as may happen to remain in there after the float-valve 20 becomes seated. It, therefore, becomes impossible to introduce any errors in reading of the meter 42, such as has heretofore been caused by the pump 36 pumping air out of the empty tank compartment 4.

If the pump 36 should be permitted to continue its pumping operation, after the float-valve 20 has become seated, however, the vacuum or suction created in the pipes 16, 14 and 34 would cause damage in the system. According to a feature of the present invention, therefore, provision is made for terminating the operation of the pump 36 as soon as the float-valve 20 becomes seated.

To this end, a small-diameter tubing pipe 44 is shown connected to the suction side of the pump 36, so as to be subjected to the same vacuum-producing or suctionproducing action by the pump 36 to which the pipe 34 is subjected. The pipe 44, therefore, may contain oil pumped out of the compartment 4, the same as the pipes 16, 14 and 34. This oil will travel, by way of the pipe 44, to a by-pass vacuum or suction cylinder chamber 46, in which is contained a piston 48. The chamber 46 may be supported below the outlet 12 of the tank compartment 4, in order that oil from the tank compartment 4 may travel freely thereinto by gravity. This, however, is not essential.

As soon as the float-valve 20 becomes seated to close the outlet 12, therefore, the pump 36, since it continues to operate, and since it can no longer pump any further fluid out of the tank compartment 4, will now produce an increased vacuum or suction effect, to suck oil or air out of the by-pass cylinder chamber 46, carrying the piston 48 with it. It is this suction or vacuum created in the connection pipes between the outlet 12 of the tank compartment 4 and the pump 36, when the oil has become substantially all pumped out therefrom, that, in accordance with a feature of the present invention, is utilized to terminate the pumping action of the pump 36.

This increased suction or vacuum effect, it will be observed, is produced at the suction side of the pump 36. If the operation were from the discharge or compression side of the pump 36, there would be danger of the pump 36, if it were powerful enough, forcing enough air to raise the float-valve 20.

According to the embodiment of the invention that is illustrated in Figs. 1 to 7, inclusive, this result is attained by causing the piston 48, during its travel, to disconnect the pump 36 from its driving mechanism. It is, therefore, in order now to describe the preferred mechanism for operating the pump 36.

The truck 2 is shown driven from a motor 50, that may be energized from any suitable source of power, such as a storage battery or a gas engine, by means of the conventional lever 52, at the front of the truck 2. The motor 50 is shown provided with a power take-off 54, that may be connected, by gearing 56, under the control of a shift lever 58 and a link mechanism 60. The pump 36 is shown connected to the gearing 56 by driving shafts and a universal joint, indicated generally at 62. The lever 58 is connected by a link 133 to a lever 131 at the rear of the truck, so that the power take-off 54 may be engaged or disengaged from this position at the rear of the truck 2, as well as from the front. By shifting the lever 131 in opposite directions, at the rear of the truck, therefore, it becomes possible to engage and disengage the power take-off 54, the same as through the medium of the lever 58, at the front of the truck.

After the motor 50 has been set into operation, to drive the truck, by the lever 52, therefore, the lever 58 may be actuated to connect the pump-operating gearing 56 to the motor drive, in order to set the pump 36 into operation. The pump 36 will then pump to deliver the oil from the tank compartment 4.

The piston 48 is shown connected, by a stem 64, to the same link 60 to which the lever 58 is connected. The pump-operating gearing 56, therefore, may be disconnected from the pump 36, in order to terminate its pumping operation, either by manipulating either of the levers 58 and 131, or through the movement of the piston 48.

Through the medium of these connections, the pumping action of the pump 36 becomes terminated automatically, as soon as the piston 48 becomes moved to the left, as viewed in Figs. 1 to 5, in the cylinder chamber 46. This movement of the piston 48 toward the left, as before explained, occurs in response to the increased suction or vacuum produced in the cylinder chamber 46 by the continued pumping operation of the pump 36, when the float-valve 20 assumes its closed position, upon substantially all the oil becoming pumped out of the compartment 4. Further delivery by the pump 36 of any substantial amount of fluid, whether oil or air, from the tank compartment 4, by way of the connection pipes, is thereby prevented, and the meter 42 is thus guarded against recording any erroneous readings from that source.

Figure 20:
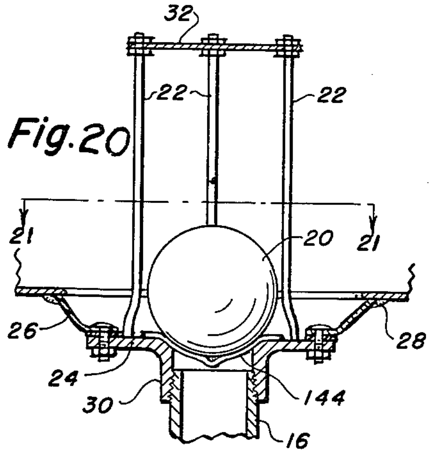
Fig. 20 is a view similar to Fig. 6, representing a modified operation of the valve.
Figure 21:
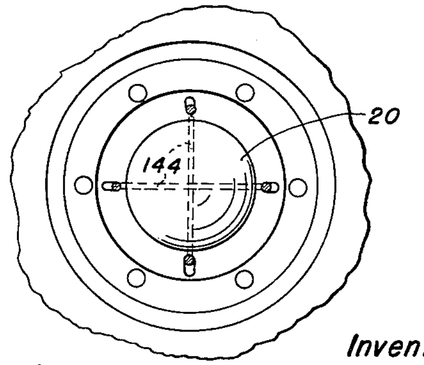
Fig. 21 is a plan section similar to Fig. 7, taken upon the line 21—21 of Fig. 20, looking in the direction of the arrows.

The same result may be attained, as explained in the said copending application, with only a negligible and, in fact, substantially no, error recorded in the meter 42, even if the float-valve 20 does not quite completely, but does substantially, close the outlet 12. This has been demonstrated, as illustrated in Figs. 20 and 21, by inserting a thin wire obstruction 144 between the float-valve 20 and the outlet 12. If a negligibly small amount of air is permitted to leak through between the float-valve 20 and the outlet 12, therefore, it will still be possible to obtain a substantially error-less reading of the meter 42, even without stopping the pump 36. Such negligibly small amount of air leakage may be provided by means of a loose fit between the float-valve 20 and the outlet 12, by providing small grooves in the sleeve 30, or in any other obvious manner. For higher precision of meter readings, however, it is desirable to shut off the further operation of the pump 36, as before described, when the tank compartment 4 becomes substantially empty, in order to prevent further delivery of any substantial amount of fluid, whether oil or air, from the tank compartment 4, by way of the connections 14, 16 and 34 and the meter 42. In both instances, however, further delivery of any substantial amount of fluid, whether oil or air, from this tank compartment 4, by way of the connection pipes 34, 14, 16 and 38, and through the meter 42, is prevented when substantially all the liquid has become delivered out of the tank compartment 4.

A further advantage arising out of terminating the operation of the pump 36 is that, if air should become trapped in one of the pipe connections, say, the pipe connection 38, on the compression side of the pump 36, there will occur no further compression of that trapped air. This avoids the danger of damaging the tank compartment 4 through excess air pressure therein, as has, at times, occurred in the prior art.

It will be obvious that the stem 64 of the piston 48 may be caused to control other mechanism than the mechanism described above for terminating the operation of the pump. As will be explained hereinafter, indeed, the same result may be obtained also otherwise than through the use of the piston 48 in the cylinder chamber 46. It will further be obvious that, with slight modification, the pump may be caused to terminate its pumping operation at any desired time, other than when the float-valve 20 becomes seated; as, for example, as hereinafter more fully explained, when the oil has become pumped out of or delivered from the tank compartment 4 to a predetermined level.

Figure 8:
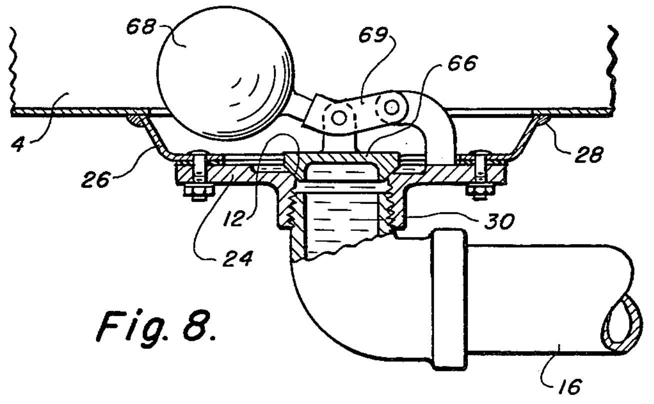
Fig. 8 is a vertical section similar to Fig. 6 of a modification.
Figure 9:
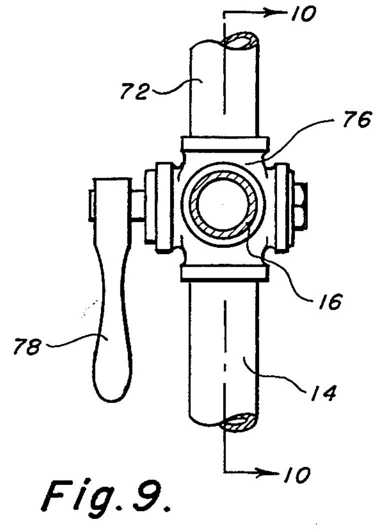
Fig. 9 is a vertical transverse section, upon a larger scale, taken upon the line 9—9 of Fig. 2, looking in the direction of the arrows.

The invention is not, of course, limited to use with the precise apparatus described above. In Fig. 8, for example, the outlet 12 is shown closed by a clapper type of valve 66, under the control of a float 68, connected to the valve 66 by a link 69.

Figure 11:
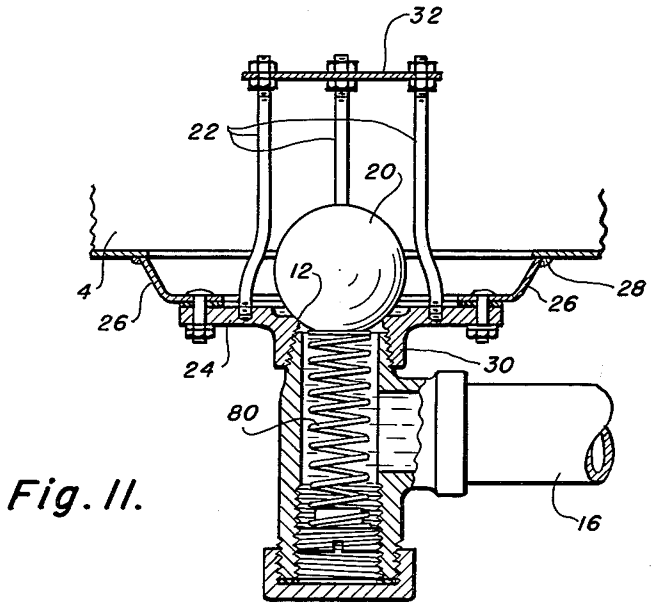
Fig. 11 is a section similar to Fig. 6 of a further modification.

The valve 20 or 66 has a tendency, when it becomes seated, owing, in part, to the continued pumping operation of the pump 36, to pound down hard against the circular wall of the outlet 12. A spring 80, as illustrated in Fig. 11, may be used to ease the pounding action. The spring 80 may serve also the further function of preventing the float-valve 20 from sticking or binding to its seat, against the circular wall of the outlet 12. The use of the spring 80 renders it more easy, therefore, to raise the float-valve 20 again, when the tank compartment 4 becomes refilled. Such binding or sticking is particularly liable to occur with small-diameter float-valves 20. The use of the suitable-size float-valve 20 of polyvinyl chloride above described, however, has eliminated all such binding or sticking.

Everything that has been described above in connection with the tank compartment 4 could equally well have been described in connection with the tank compartment 6. The outlet 13, in the bottom of the tank compartment 6, is shown connected to a pipe 70, which corresponds to the pipe 16, that is connected to the outlet 12 of the tank compartment 4. The pipe 70 is shown, in Fig. 2, connected to a pipe 72, in the same manner that the pipe 16 is connected to the pipe 14. In Fig. 4, however, the pipe 70 is diagrammatically shown connected to the same pipe 14. The pipe 70 is therefore connected to the pipe 34, similarly to the connection thereto of the pipe 16.

By providing the two tank compartments 4 and 6, instead of only a single compartment 4, therefore, provision is made for connecting the pump 36 to the tank compartment 6 promptly after the compartment 4 has become emptied. It is desirable, however, that only one of the two tank compartments 4 and 6 be connected to the pump 36 at one and the same time.

Figure 10:
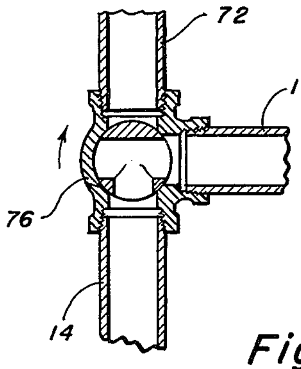
Fig. 10 is a vertical section taken upon the line 10—10 of Fig. 9, looking in the direction of the arrows.

This result may be attained by connecting both the pipe 16 and the pipe 70 or 72, that are respectively connected to the respective outlets 12 and 13 of the tank compartments 4 and 6, to a single two-position manifold or plug valve 76. By means of a handle 78, the two-position manifold valve 76 may be connected to either the pipe 16 or the pipe 70 or 72. In one position of the handle 78, illustrated in Fig. 10, the two-position manifold valve 76 connects the pump 36 to the pipe 16, and disconnects it from the pipe 70 or 72. In the other position of the handle 78, the two-position manifold or plug valve 76 connects the pump 36 to the pipe 70 or 72, and disconnects it from the pipe 16.

According to the modification illustrated in Fig. 12, the pumping operation becomes terminated through the control of the ignition of the gas engine for driving the truck motor 50. The pipe 44 is shown, in Fig. 12, connected, not to the vacuum or suction cylindrical chamber 46, shown in Fig. 3, but to a normally closed vacuum switch 82. Instead of actuating the piston 48, when the valve 20 or 66 becomes closed, therefore, the pump 36 will operate the vacuum switch 82, to open it.

The vacuum switch 82 is shown connected in a circuit 84, having an energizing battery 86, an ignition coil 88, and a distributor 92. If the ignition switch 90 of the circuit 84 is closed, as it normally is, when the engine is running, the operation of the vacuum switch 82 will open the ignition circuit, thereby rendering the ignition of the gas-engine ineffective, and thus shutting off the truck-driving motor 50. The pump 36, therefore, will stop operating.

Figure 13:
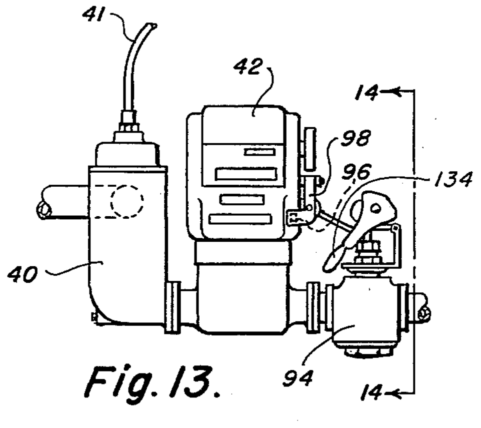
Fig. 13 is a fragmentary side elevation of a further modified apparatus, designed to shut off the oil flow.
Figure 14:
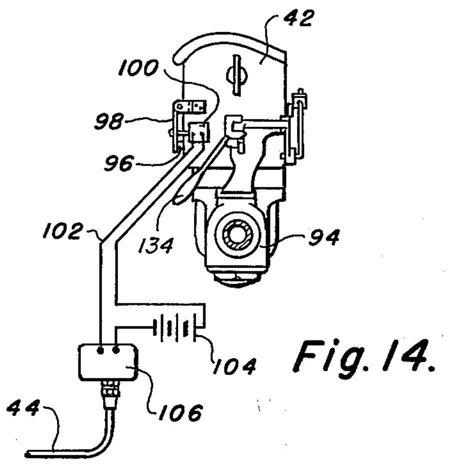
Fig. 14 is a section taken upon the line 14—14 of Fig. 13, looking in the direction of the arrows.
Figure 15:
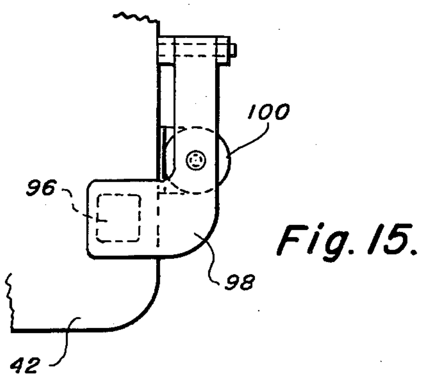
Fig. 15 is a front elevation, upon a larger scale, of parts of the apparatus shown in Fig. 13.

In Figs. 13, 14 and 15, the meter 42 is shown, together with a conventional valve 94. The valve 94 is opened by a hand-operated lever 134, and it closes automatically after the amount of oil has been delivered, through the hose 8, for which the meter 42 has been pre-set. There is shown also a conventional button 96 for shutting off the delivery of the oil at any time, at will.

The button 96 may also be operated, however, by a lever 98, which is illustrated as under the control of a solenoid 100, connected in a circuit 102 having an energizing battery 104. The circuit 102 contains also a normally open vacuum switch 106, which may be operated in a manner similar to the operation of the vacuum switch 82 of Fig. 12, in response to the vacuum or suction in the pipe 44.

Just as the vacuum switch 82 effects the operation of the ignition coil 88, in the circuit of Fig. 12, so the vacuum switch 106 effects the operation of the lever 98, to press the button 96, which causes the valve 94 to close. The meter 42 thereupon stops recording.

Figure 16:
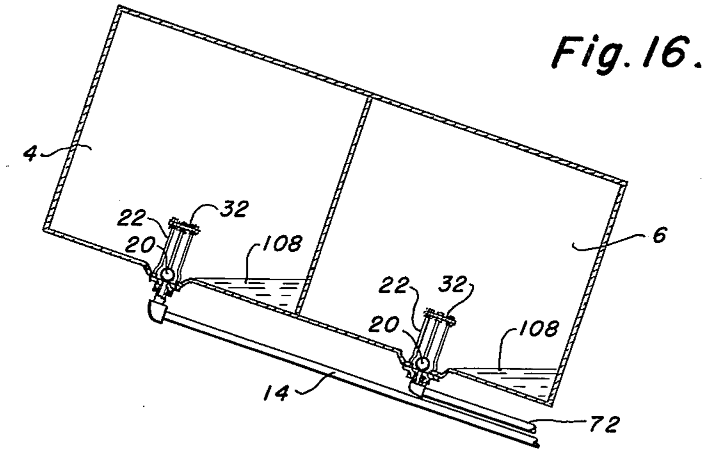
Fig. 16 is a side elevation of the tank shown in Fig. 1, the truck on which it is mounted, not shown, being assumed to be standing upon a hill, sloping downward from left to right.

The above description has been based upon the supposition that the truck 2 is level at the time that the tank compartment 4 becomes empty. If, however, the truck 2 should happen to be upon an inclined street, the mechanism above described for terminating the operation of the pump 36 would be set into operation before the tank compartment 4 should become entirely empty, and also before the tank compartment 6 should also become entirely empty. Both tank compartments 4 and 6, though they will have become substantially emptied, in the manner above described, would still, nevertheless, contain a little oil, in their lower ends, as illustrated at 108 in Fig. 16. Under such circumstances, instead of the tank compartments 4 and 6 having become entirely emptied upon the closing of the outlets 12 and 13 by the respective float-valves 20, the oil therein will have become reduced to a predetermined low level in the respective tank compartments 4 and 6.

Figure 17:
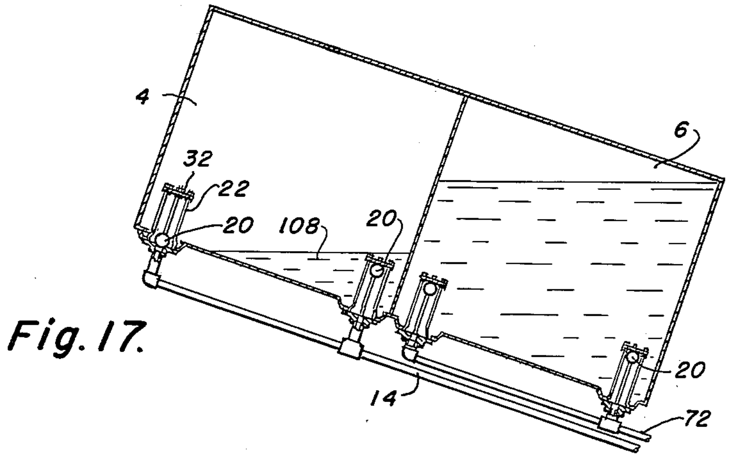
Fig. 17 is a similar side elevation of a modified tank.
Figure 18:
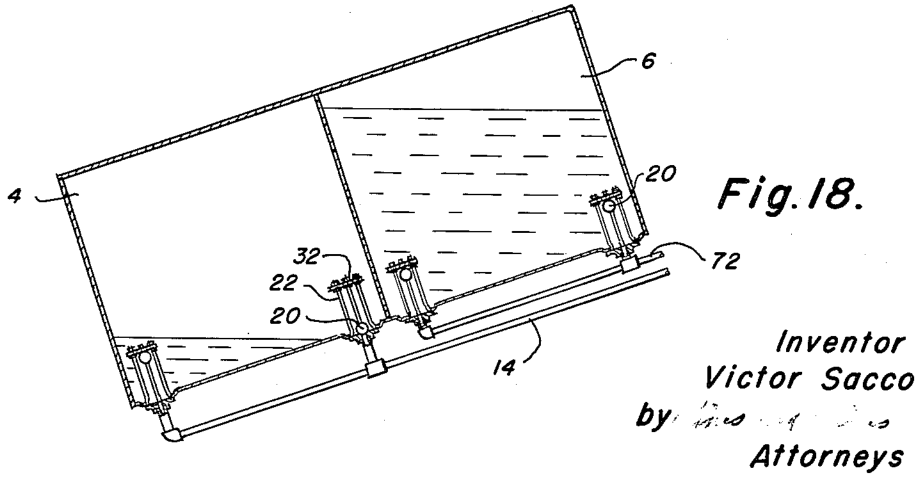
Fig. 18 is a similar elevation showing the modified tank of Fig. 17 when mounted upon a truck standing upon a hill sloping in the opposite direction, downward, from right to left.

According to a further feature of the invention, therefore each tank compartment 4 and 6 may be provided with two outlets at opposite ends of its bottom, one at each end of the compartment, as illustrated in Fig. 17. The two outlets of each compartment are shown interconnected; those of the compartment 4 to the pipe 14 and those of the compartment 6 to the pipe 72. The remaining connections may be the same as already described above.

When the oil has been delivered from the tank compartment 4 substantially to the level of the left-hand outlet, as shown at the left of Fig. 17, the left-hand float-valve 20 will close the left-hand outlet, but oil will continue to be pumped out of the right-hand outlet until the tank compartment 4 is empty; at which time, the right-hand float-valve 20 will close the right-hand outlet. With both of these outlets closed, the suction will be increased, causing the vacuum cylinder 46, the vacuum switch 82 or the solenoid 100 to disengage the power take-off 54 or its equivalent, as above described. The pump 36 will thereupon cease operation, and the meter 42 will cease recording, as also above described. The pump 36 will then be re-connected to pump the oil out of the tank compartment 6, and the meter 42 will be re-set to record the flow of oil therefrom. After the oil has been delivered out of the tank compartment 6 to the level of the outlet at the left-hand end of the tank compartment 6, the left-hand float-valve 20 will close the left-hand outlet thereof, and the remaining oil in the tank compartment 6 will be delivered out through the outlet at its righthand end, until the tank compartment 6 becomes substantially empty. The right-hand float-valve 20 will thereupon close the right-hand outlet of the tank compartment 6, and the pump will again be stopped, as above described.

Figure 19:
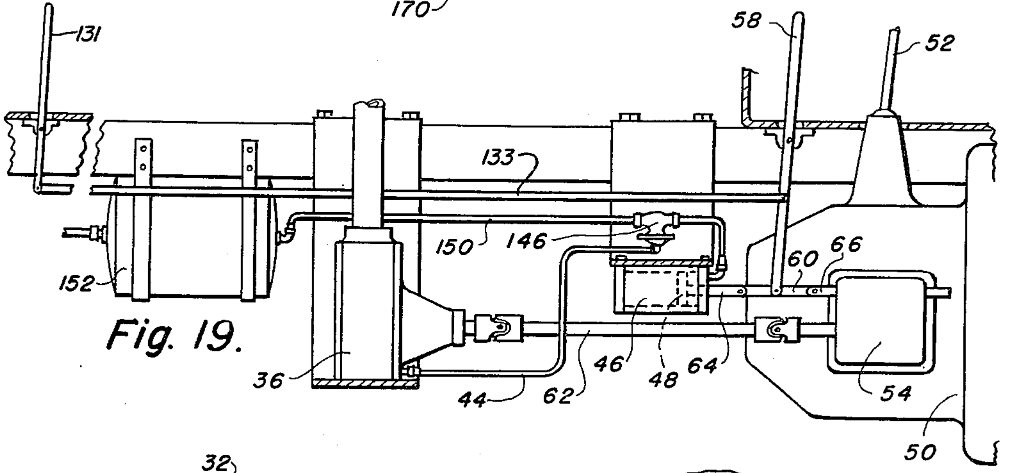
Fig. 19 is a view similar to Fig. 3 of still another modification.

A modified method of disengaging the power take-off 54 is illustrated in Fig. 19. As the float-valve 20 closes, upon the emptying, or near emptying, of the tank compartment 4, the degree of suction in the pipe connections 16, 14 and 34 becomes gradually increased. The tubing 44 is shown connected to a vacuum-operable valve 146, which becomes opened in response to this suction. Upon this valve 146 becoming opened, air under pressure becomes admitted, from an air-brake supply tank 152, to the cylinder 46. The piston 48 becomes thereupon operated, to disengage the power take-off 54, by compressed air, though indirectly in response to the part vacuum created in the tubing 44.

The invention is not restricted to use with oil tanks mounted on trucks. The invention may be used wherever it is desired to terminate further pumping of liquid when the tank becomes emptied, or the liquid therein falls to a predetermined level.

Several additional sumps and cages will now be described, with particular reference to Figs. 22, 23 and 24.

Figures 22, 23, 24:
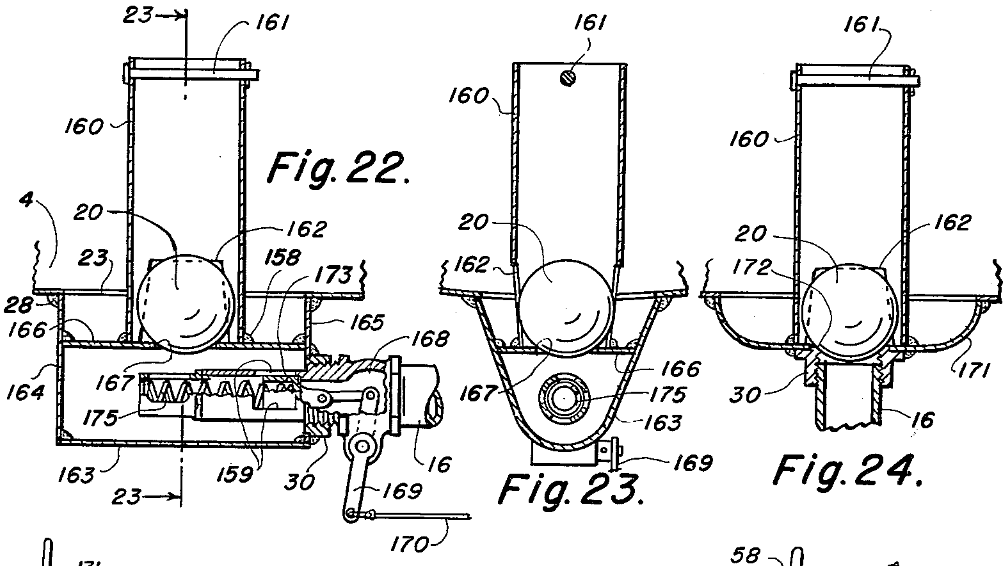
Fig. 22 is a vertical section, similar to Figs. 6, 8 and 20, but upon a somewhat smaller scale, of a further modification.
Fig. 23 is a vertical section, taken upon the line 23—23 of Fig. 22, looking in the direction of the arrows.
Fig. 24 is a vertical section, similar to Fig. 22, of still another modification.

The free upper edge or edges of the sump 163, shown in Figs. 22 and 23, are shown welded, at 28, to the bottom of the tank compartment 4, with the opening 23 disposed directly thereabove, similarly to the construction of the sump 26 described above in connection with Figs. 6, 7 and 8. The cross-sectional shape of the sump 163, however, is not quite the same as that of the sump 26. It is shown oblong in horizontal cross-section, and substantially V-shaped or U-shaped in transverse vertical cross-section. The sump 163 is closed at its opposite ends by walls 164 and 165, and the end wall 165 is provided with an opening for connection to a pipe 168, corresponding somewhat to the pipe 16, before described.

The sump 163 is intermediately provided with a horizontally disposed wall 166 having a circular outlet 167 corresponding to the circular outlet that has heretofore been designated by the reference numeral 12 or 13.

A cylindrical metal cage 160, the lower end of which is welded, as shown at 158, to the intermediately disposed wall 166, extends substantially vertically above and concentrically with the circular outlet 167, and the floatable ball valve 20 rises and falls in this circular cage 160 in the same manner described above.

A transversely disposed rod 161 at the top of the cage 160 confines the ball valve 20 within the cage during its up-and-down floating movements. The lower end of the cage is provided with openings 162 through which communication is had between the interior of the cage and the interior of the tank compartment 4.

The cup-shaped sump 171 shown in Fig. 24 is similar to that of Figs. 6 to 8, but it is shown made in one piece, with the circular outlet 172 at the center thereof.

The pipe 168 is provided with openings 159 through which the oil or other liquid may travel from the circular outlet 167 when a safety or emergency valve 173 is open. The valve 173 is normally closed by a spring 175, but may be opened by a lever 169 that may be pivotally actuated by means of a cable 170. It is necessary to actuate the cable 170, as well as the two-position manifold valve 76, in order to permit the oil or other liquid to be dispensed from the tank compartment. The valve 173, therefore, will prevent accidental discharge of the liquid from the tank compartment in the event that there should be a break in the line below the tank outlet 167. A fusible release, not shown, operates automatically to permit the spring 175 to close the valve 173, in case of fire.

Figure 25:
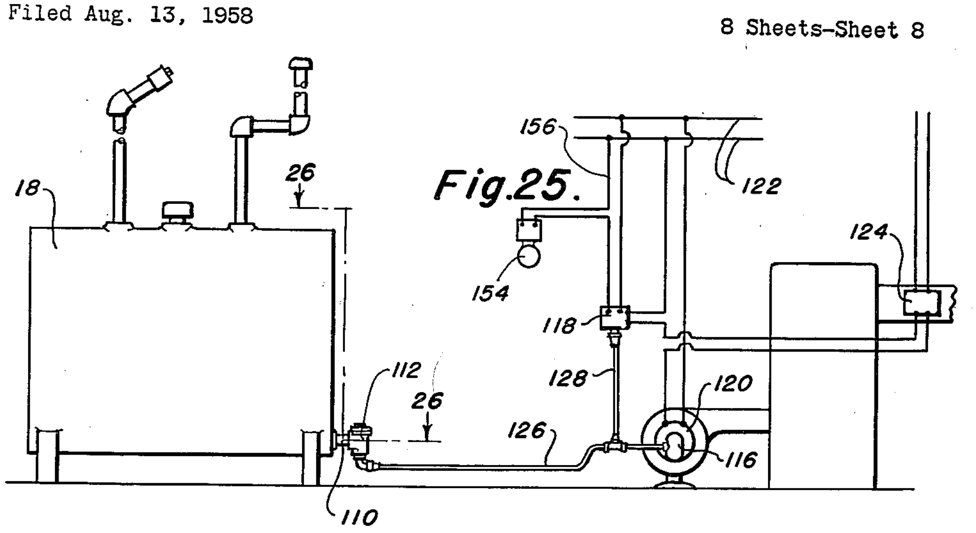
Fig. 25 is a side elevation, illustrating a feature of the present invention as embodied in a standard householder's storage tank.
Figure 26:
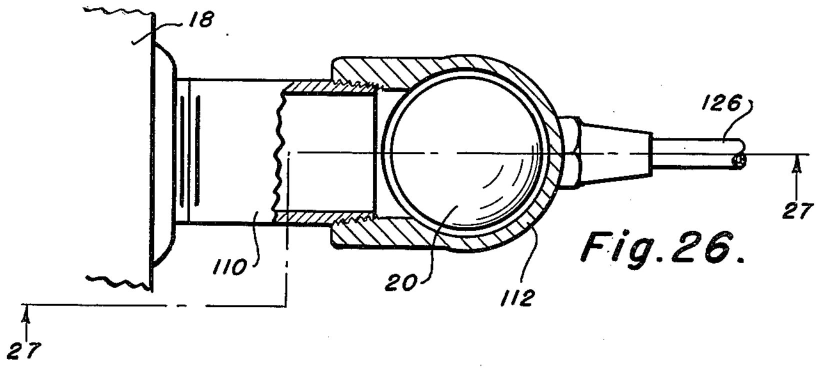
Fig. 26 is a horizontal section, upon a larger scale, taken upon the line 26—26 of Fig. 25, looking downward, in the direction of the arrows.
Figure 27:
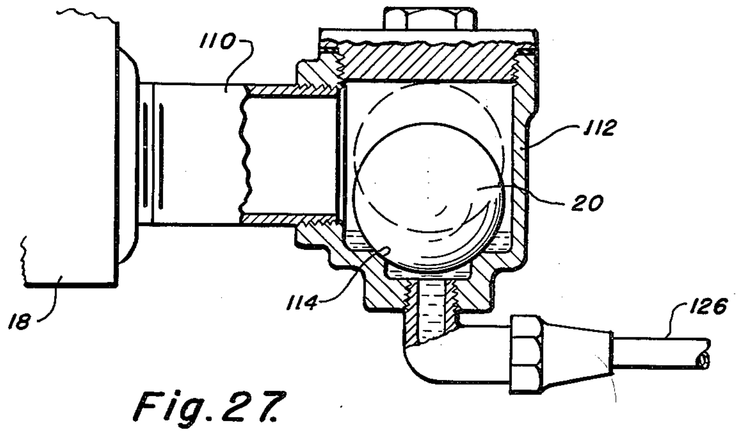
Fig. 27 is a vertical section, taken upon the line 27—27 of Fig. 26, looking in the direction of the arrows.

In Figs. 25, 26 and 27, the invention is illustrated for use with the householder's standard storage tank 18. A small pump 116, driven by the burner motor 120, pumps the oil out of the storage tank 18, for the purpose of burning it in the oil burner. The present invention may be used in such installations to cause the small pump 116 to cease pumping upon the storage tank 18 becoming empty. If the small pump 116 were to continue pumping after the storage tank 18 becomes empty, air would be drawn into the pump. It would then become necessary, after the tank had been refilled, to prime the pump, in order to enable the burner to start operating again.

Present-day equipment of this character is provided with means for shutting off the small pump when the storage tank becomes empty. That shutting-off means, however, is thermostatic, and does not become effective until the oil burner cools sufficiently. The present invention, on the other hand, is much more efficient, operating promptly, the moment that the storage tank empties.

If the storage tank 18 were to be manufactured anew, instead of being purchased as standard, the outlet 12 and the valve 20 or 66 or its equivalent could be embodied therein in the same manner as described above in connection with the tank compartments 4 and 6.

The invention may be used with conventional standard storage tanks 18, however, by connecting, to a pipe 110, at the bottom thereof, a housing 112 for containing the float-valve 20 or its equivalent. The suction line 126 is shown connected to the pump 116, and a line 128 is shown tapped off to a normally closed vacuum switch 118. When the storage tank 18 is full, and until it becomes nearly empty, the float-valve 20 will occupy the upper dashed-line position illustrated in Fig. 27. As the tank approaches exhaustion, however, the float-valve 20 will begin to become lowered until, when the storage tank 18 becomes entirely empty, it will become seated to close the outlet 114 at the lower end of the housing 112. It will then be impossible to pump any further liquid, or, for that matter, any other fluid, out of the storage tank 18. The normally closed vacuum switch 118 is shown connected in the burner-motor circuit, which consists of the supply lines 122 and the stack control 124. When the float-valve 20 closes the outlet 114, the resulting increase in the suction will open the vacuum switch 118, which will result in stopping the motor 120 that drives the pump 116. The pumping action will thereupon become terminated, and injury to the pump, by preventing its running while dry, will be prevented.

There is shown also an indicator 154, connected in a circuit 156 between the supply lines 122 and the vacuum switch 118, for giving an indication, which may be visual, audible or otherwise, as to when the tank compartment 4 has become empty, the motor 120 has stopped operating, and the meter 42, therefore, has ceased registering. Although this is shown only in Fig. 25, it will be understood that it may be incorporated also in the other modifications described above. The indicating circuit 156 may, for example, be connected into the circuit of the vacuum-operating switches described above.

Further modifications will occur to persons skilled in the art, and all such are considered to fall within the spirit and scope of the present invention, as defined in the appended claims.

What is claimed is:

1. Liquid-pumping apparatus comprising a tank having two compartments for containing the liquid each having an outlet, a pump, two pipe connections between the pump and the respective outlets by way of which the pump may deliver the liquid from the respective compartments when the respective outlets are open, a two-position valve for connecting the pump to one of the pipe connections and disconnecting it from the other pipe connection in one of its positions and for connecting the pump to the said other pipe connection and disconnecting it from the said one pipe connection in its other position, a compartment valve for substantially closing the outlet of one of the compartments, means for operating the pump, means for connecting the operating means to the pump to cause the pump to deliver the liquid from the said one compartment through its outlet and by way of the pipe connection connected thereto, when the outlet of the said one compartment is open and the two-position valve occupies one of its two positions, means whereby the compartment valve is caused substantially to close the outlet of the said one compartment when the liquid has become delivered from the said one compartment to substantially the level of the outlet of the said one compartment, and means for thereupon disconnecting the operating means from the pump in order to terminate the pumping operation of the pump, thereby to prevent further delivery by the pump of any substantial amount of fluid from the said one compartment, through its outlet and by way of the pipe connection connected thereto, prior to the two-position valve being actuated to its other position.

2. Liquid-pumping apparatus comprising a tank having two compartments for containing the liquid each having an outlet, a pump, two pipe connections respectively connected to the outlets, a chamber connected to the pump and the pipe connections by way of which the pump may delives the liquid from the respective compartments when the respective outlets are open, a two-position valve for connecting the chamber to one of the pipe connections and disconnecting it from the other pipe connection in one of its positions and for connecting the chamber to the said other pipe connection and disconnecting it from the said one pipe connection in its other position, a compartment valve for substantially closing the outlet of one of the compartments, means for operating the pump, means for connecting the operating means to the pump to cause the pump to deliver the liquid from the said one compartment, through its outlet and by way of the pipe connection connected thereto and the chamber, when the outlet of the said one compartment is open and the two-position valve occupies one of its two positions, means whereby the compartment valve is caused substantially to close the outlet of the said one compartment when the liquid has become delivered from the said one compartment to substantially the level of the outlet of the said one compartment, and means for thereupon disconnecting the operating means from the pump in order to terminate the pumping operation of the pump, thereby to prevent further delivery by the pump of any substantial amount of fluid from the said one compartment, through its outlet and by way of the pipe connection connected thereto and the chamber, prior to the two-position valve being actuated to its other position.

3. Liquid-pumping apparatus comprising a truck, means for driving the truck, a tank mounted on the truck having two compartments for containing liquid each having an outlet, a pump, two pipe connections respectively connected to the outlets, a chamber connected to the pump and the pipe connections by way of which the pump may deliver the liquid from the respective compartments when the respective outlets are open, a two-position valve for connecting the chamber to one of the pipe connections and disconnecting it from the other pipe connection in one of its positions and for connecting the chamber to the said other pipe connection and disconnecting it from the said one pipe connection in its other position, a compartment valve for substantially closing the outlet of one of the compartments, gearing, means for connecting the gearing to the truck-driving means and to the pump for operating the pump to cause the pump to deliver the liquid from the said one compartment, through its outlet and by way of the pipe connection connected thereto and the chamber, when the outlet of the said one compartment is open and the two-position valve occupies one of its two positions, means whereby the compartment valve is caused substantially to close the outlet of the said one compartment when the liquid has become delivered from the said one compartment to substantially the level of the outlet of the said one compartment, and means for thereupon disconnecting the gearing from the pump in order to terminate the pumping operation of the pump, thereby to prevent further delivery by the pump of any substantial amount of fluid from the said one compartment through its outlet and by way of the pipe connection connected thereto, and the chamber prior to the two-position valve being actuated to its other position.

4. Liquid-pumping apparatus comprising a tank having two compartments for containing the liquid each having an outlet, a pump, two pipe connections respectively connected to the outlets, a pump-connection chamber connected to the pump and the pipe connections by way of which the pump may deliver the liquid from the respective compartments when the respective outlets are open, a two-position valve for connecting the pump-connection chamber to one of the pipe connections and disconnecting it from the other pipe connection in one of its positions and for connecting the pump-connection chamber to the said other pipe connection and disconnecting it from the said one pipe connection in its other position, a compartment valve for substantially closing the outlet of one of the compartments, means for operating the pump, means for connecting the operating means to the pump to cause the pump to deliver the liquid from the said one compartment, through its outlet and by way of the pipe connection connected thereto and the pipe-connection chamber, when the outlet of the said one compartment is open and the two-position valve occupies one of its two positions, a by-pass chamber connected to the pump-connection chamber, means whereby the compartment valve is caused substantially to close the outlet of the said one compartment when the liquid has become delivered from the said one compartment to substantially the level of the outlet of the said one compartment, thereby enabling the pump to create increased suction in the by-pass chamber, and means controlled to the increased suction for thereupon disconnecting the operating means from the pump in order to terminate the pumping operation of the pump, thereby to prevent further delivery by the pump of any substantial amount of fluid from the said one compartment, through its outlet and by way of the pipe connection connected thereto and the pump-connection chamber, prior to the two-position valve being actuated to its other position.

5. Liquid-pumping apparatus comprising a tank having two compartments for containing the liquid each having an outlet, a pump, two pipe connections respectively connected to the outlets, a pump-connection-chamber connected to the pump and the pipe connections by way of which the pump may deliver the liquid from the respective compartments when the respective outlets are open, a two-position valve for connecting the pump-connection chamber to one of the pipe connections and disconnecting it from the other pipe connection in one of its positions and for connecting the pump-connection chamber to the said other pipe connection and disconnecting it from the said one pipe connection in its other position, a compartment valve for substantially closing the outlet of one of the compartments, means for operating the pump, means for connecting the operating means to the pump to cause the pump to deliver the liquid from the said one compartment, through its outlet and by way of the pipe connection connected thereto and the pipe-connection chamber, when the outlet of the said one compartment is open and the two-position valve occupies one of its two positions, a by-pass chamber connected to the pump-connection chamber, means whereby the compartment valve is caused substantially to close the outlet of the said one compartment when the liquid has become delivered from the said one compartment to substantially the level of the outlet of the said one compartment, thereby enabling the pump to create increased suction in the by-pass chamber, a switch controlled by the increased suction, and means controlled by the switch for disconnecting the operating means from the pump in order to terminate the pumping operation of the pump, thereby to prevent further delivery by the pump of any substantial amount of fluid from the said one compartment, through its outlet and by way of the pipe connection connected thereto and the pump-connection chamber, prior to the two-position valve being actuated to its other position.

6. Liquid-pumping apparatus comprising a tank for containing the liquid having two outlets respectively positioned at opposite ends of its bottom, a valve for closing each outlet, interconnected outlet pipes connected to the respective outlets, a pump, a pipe connection between the pump and the interconnected outlet pipes, means for operating the pump, means for connecting the operating means to the pump to cause the pump to deliver the liquid from the tank, in an inclined position, through the respective upper and lower outlets and by way of the respective outlet pipes connected thereto and the pipe connection when the upper and lower outlets are respectively open, means whereby the valve for the upper outlet is caused substantially to close the upper outlet when the liquid has become delivered from the tank substantially to the level of the upper outlet, means whereby the valve for the lower outlet is thereafter caused substantially to close the lower outlet when the liquid has become delivered from the tank substantially to the level of the lower outlet, and means for disconnecting the operating means from the pump upon the closing of the lower outlet by its valve in order to terminate the pumping operation of the pump, thereby to prevent further delivery by the pump of any substantial amount of fluid from the tank through the lower outlet and by way of the outlet pipe connected thereto and the pipe connection.

7. In liquid-pumping apparatus comprising a tank having two compartments for containing the liquid each having an outlet, a pump, two pipe connections respectively connected to the outlets, a two-position valve for connecting the pump to one of the pipe connections and disconnecting it from the other pipe connection in one of its positions and for connecting the pump to the said other pipe connection and disconnecting it from the said one pipe connection in its other position, and means for operating the pump, a method of dispensing the liquid from the tank that comprises actuating the two-position valve to one of its two positions, connecting the operating means to the pump to cause the pump to deliver the liquid from one of the compartments through its outlet and by way of the pipe connection connected thereto, closing the outlet of the said one compartment when the liquid has become delivered from the said one compartment substantially to the level of the outlet of the said one compartment, thereupon disconnecting the operating means from the pump in order to terminate the pumping operation of the pump, then actuating the two-position valve to its other position, and finally reconnecting the operating means to the pump to cause the pump to deliver the liquid from the other compartment through its outlet and by way of the pipe connection connected thereto.

8. Liquid-pumping apparatus comprising a tank having two compartments for containing the liquid each having an outlet, a pump, two pipe connections between the pump and the respective outlets by way of which the pump may deliver the liquid from the respective compartments when the respective outlets are open, a two-position valve for connecting the pump to one of the pipe connections and disconnecting it from the other pipe connection in one of its positions and for connecting the pump to the said other pipe connection and disconnecting it from the said one pipe connection in its other position, means for operating the pump, means for connecting the operating means to the pump to cause the pump to deliver the liquid from one of the compartments, through its outlet and by way of the pipe connection connected thereto, when the outlet of the said one compartment is open and the two-position valve occupies one of its two positions, a float valve in the said one compartment for substantially closing the outlet of the said one compartment when the liquid has become delivered from the said one compartment to substantially the level of the outlet of the said one compartment, and means for thereupon disconnecting the operating means from the pump in order to terminate the pumping operation of the pump, thereby to prevent further delivery by the pump of any substantial amount of fluid from the said one compartment, through its outlet and by way of the pipe connection connected thereto, prior to the two-position valve being actuated to its other position.

9. Liquid-pumping apparatus comprising a tank having two compartments for containing the liquid each having an outlet, a pump, two pipe connections respectively connected to the outlets, a chamber connected to the pump and the pipe connections by way of which the pump may deliver the liquid from the respective compartments through the respective outlets, a two-position valve for connecting the chamber to one of the pipe connections and disconnecting it from the other pipe connection in one of its positions and for connecting the chamber to the said other pipe connection and disconnecting it from the said one pipe connection in its other position, means for connecting the pump to a source of power to cause the pump to deliver the liquid from one of the compartments, through its outlet and by way of the pipe connection connected thereto and the chamber, when the two-position valve occupies one of its two positions, and means for disconnecting the pump from its source of power when the liquid has become delivered from the said one compartment to a predetermined level, in order to terminate the pumping operation of the pump, thereby to prevent further delivery by the pump of any substantial amount of fluid from the said one compartment, through its outlet and by way of the pipe connection connected thereto and the chamber, prior to the two-position valve being actuated to its other position.

10. In liquid-pumping apparatus comprising a tank having two compartments for containing the liquid each having an outlet, a pump, two pipe connections respectively connected to the outlets, a two-position valve for connecting the pump to one of the pipe connections and disconnecting it from the other pipe connection in one of its positions and for connecting the pump to the said other pipe connection and disconnecting it from the said one pipe connection in its other position, and means for connecting the pump to a source of power, a method of dispensing the liquid from the tank that comprises actuating the two-position valve to one of its two positions, connecting the pump to its source of power to cause the pump to deliver the liquid from one of the compartments through its outlet and by way of the pipe connection connected thereto, disconnecting the pump from its source of power when the liquid has become delivered from the said one compartment to a predetermined level in order to terminate the pumping operation of the pump, then actuating the two-position valve to its other position, and finally reconnecting the pump to its source of power to cause the pump to deliver the liquid from the other compartment through its outlet and by way of the pipe connection connected thereto.

11. Liquid-pumping apparatus comprising a tank for containing the liquid having two outlets respective positioned at opposite ends of its bottom, a valve for closing each outlet, interconnected outlet pipes connected to the respective outlets, a pump, a pipe connection between the pump and the interconnected outlet pipes, means for operating the pump, means for connecting the operating means to the pump to cause the pump to deliver the liquid from the tank, in an inclined position, through the respective upper and lower outlets and by way of the respective outlet pipes connected thereto and the pipe connection when the upper and lower outlets are respectively open, means whereby the valve for the upper outlet is caused substantially to close the upper outlet when the liquid has become delivered from the tank substantially to the level of the upper outlet, and means whereby the valve for the lower outlet is thereafter caused substantially to close the lower outlet when the liquid has become delivered from the tank substantially to the level of the lower outlet.

12. Liquid-pumping apparatus comprising a tank for containing the liquid having two outlets respectively positioned at opposite ends of its bottom, a float-controlled valve for closing each outlet, interconnected outlet pipes connected to the respective outlets, a pump, a pipe connection between the pump and the interconnected outlet pipes, means for operating the pump, means for connecting the operating means to the pump to cause the pump to deliver the liquid from the tank, in an inclined position, through the respective upper and lower outlets and by way of the respective outlet pipes connected thereto and the pipe connection when the upper and lower outlets are respectively open, whereby the float-controlled valve for the upper outlet is caused substantially to close the upper outlet when the liquid has become delivered from the tank substantially to the level of the upper outlet, and means whereby the float-controlled valve for the lower outlet is thereafter caused substantially to close the lower outlet when the liquid has become delivered from the tank substantially to the level of the lower outlet.

13. Liquid-delivering apparatus comprising a tank for containing the liquid having two interconnected outlets respectively positioned at opposite ends of its bottom, a valve for closing each outlet, a pump connected to the interconnected outlets, means for operating the pump, means for connecting the operating means to the pump to cause the pump to deliver the liquid from the tank, in an inclined position, through the respective upper and lower outlets, when they are respectively open, means whereby the valve for the upper outlet is caused substantially to close the upper outlet when the liquid has become delivered from the tank substantially to the level of the upper outlet, and means whereby the valve for the lower outlet is thereafter caused substantially to close the lower outlet when the liquid has become delivered from the tank substantially to the level of the lower outlet.

14. Liquid-delivering apparatus comprising a tank for containing the liquid having two interconnected outlets respectively positioned at opposite ends of its bottom, a valve for closing each outlet, means whereby the liquid may be delivered from the tank, in an inclined position, through the respective upper and lower outlets when they are respectively open, means whereby the valve for the upper outlet is caused substantially to close the upper outlet when the liquid has become delivered from the tank substantially to the level of the upper outlet, and means whereby the valve for the lower outlet is thereafter caused substantially to close the lower outlet when the liquid has become delivered from the tank substantially to the level of the lower outlet.

15. Liquid-delivering apparatus comprising a tank having two compartments for containing the liquid each having an outlet, two connections respectively connected to the outlets, a chamber connected to the connections by way of which the liquid may be delivered from the respective compartments through the respective outlets, a two-position valve for connecting the chamber to one of the connections and disconnecting it from the other connection in one of its positions and for connecting the chamber to the said other connection and disconnecting it from the said one connection in its other position, means whereby the liquid may be delivered from one of the compartments, through its outlet and by way of the connection connected thereto and the chamber, when the two-position valve occupies either of its two positions, and means for preventing further delivery of any substantial amount of fluid from the said one compartment through its outlet and by way of the connection connected thereto and the chamber when the liquid has become delivered from the said one compartment substantially to the level of the outlet of the said one compartment.

References Cited in the file of this patent

UNITED STATES PATENTS

| | | |
|---|---|---|
| 1,052,034 | Bowser | Feb. 4, 1913 |
| 1,825,775 | Brubaker | Oct. 6, 1931 |
| 2,063,727 | Davis | Dec. 8, 1936 |
| 2,703,190 | Muller | Mar. 1, 1955 |